(12) United States Patent
Senthilnathan et al.

(10) Patent No.: US 8,194,698 B2
(45) Date of Patent: Jun. 5, 2012

(54) QUALITY OF SERVICE UPDATE PROCEDURE

(75) Inventors: Janakiraman Senthilnathan, Nashua, NH (US); Kuntal Chowdhury, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 596 days.

(21) Appl. No.: 11/500,552

(22) Filed: Aug. 7, 2006

(65) Prior Publication Data

US 2007/0036078 A1 Feb. 15, 2007

Related U.S. Application Data

(60) Provisional application No. 60/705,983, filed on Aug. 5, 2005, provisional application No. 60/707,363, filed on Aug. 11, 2005, provisional application No. 60/740,733, filed on Nov. 30, 2005.

(51) Int. Cl.
*H04J 3/00* (2006.01)
(52) U.S. Cl. ...................................... 370/464
(58) Field of Classification Search .......... 370/229–234, 370/310, 329–333, 464–468
See application file for complete search history.

(56) References Cited

U.S. PATENT DOCUMENTS

| | | | |
|---|---|---|---|
| 6,564,061 B1 | 5/2003 | Guo et al. | |
| 6,683,853 B1 * | 1/2004 | Kannas et al. | 370/237 |
| 6,728,208 B1 | 4/2004 | Puuskari et al. | |
| 6,940,836 B2 | 9/2005 | Borella et al. | |
| 7,155,215 B1 * | 12/2006 | Miernik et al. | 455/423 |
| 2004/0006613 A1 | 1/2004 | Lemieux et al. | |
| 2004/0116117 A1 * | 6/2004 | Ahvonen et al. | 455/432.3 |
| 2004/0248577 A1 * | 12/2004 | Sayeedi | 455/445 |
| 2005/0064821 A1 * | 3/2005 | Hedberg et al. | 455/67.11 |
| 2005/0094611 A1 * | 5/2005 | Cheong et al. | 370/342 |
| 2005/0141527 A1 * | 6/2005 | Gateva et al. | 370/401 |
| 2005/0169171 A1 * | 8/2005 | Cheng et al. | 370/229 |
| 2006/0002333 A1 * | 1/2006 | Skog et al. | 370/328 |
| 2006/0002377 A1 * | 1/2006 | Skog et al. | 370/352 |

(Continued)

FOREIGN PATENT DOCUMENTS

WO WO2007097836 8/2007

OTHER PUBLICATIONS

International Search Report and Written Opinion of the International Searching Authority for International Patent Application No. PCT/US2006/30509.

(Continued)

*Primary Examiner* — Kwang B Yao
*Assistant Examiner* — Juvena Loo
(74) *Attorney, Agent, or Firm* — Wilmer Cutler Pickering Hale and Dorr LLP

(57) ABSTRACT

Methods and systems are provided for updating the quality of service (QoS) of an IP flow in a wireless communications system. More particularly, the methods and systems provide the ability to update a QoS grant from any level of QoS to any other level of QoS, from no QoS to some level of QoS, and from some level of QoS to no level of QoS. The update of QoS can be based, at least in part, on a request being made for an updated QoS. A decision is made whether or not to update the QoS; and depending on the decision, the QoS can be updated.

24 Claims, 16 Drawing Sheets

U.S. PATENT DOCUMENTS

2006/0092904 A1* 5/2006 Carson .......................... 370/342
2006/0246900 A1* 11/2006 Zheng ........................ 455/435.3
2007/0195788 A1 8/2007 Vasamsetti et al.

OTHER PUBLICATIONS

Fourth Amended Complaint, *UTSTARCOM, Inc.*, vs. *Starent Networks, Corp.*, et al., in the United States District Court for the Northern District of Illinois Eastern Division, Case 1:07-cv-02582, Document 207, Filed Sep. 25, 2008, pp. 1, 48, 70 and 91.

3GPP2 A.S0017-C, Version 1.0, Interoperability Specification (IOS) for cdma2000 Access Network Interfaces—Part 7 (A10 and A11 Interfaces), Feb. 2005.

3GPP2 P.S0001-B, Version 2.0 cdma2000 Wireless IP Network Standard, Sep. 2004.

3GPP2 X.S0011-001-D, Version: 1.0, cdma2000 Wireless IP Network Standard: Introduction, Feb. 2006.

3GPP2 A.S0008-0 v3.0, Interoperability Specification (IOS) for High Rate Packet Data (HRPD) Access Network Interfaces, May 2003.

3GPP2 A.S0008-A v1.0, Interoperability Specification (IOS) for High Rate Packet Data (HRPD) Radio Access Network Interfaces with Session Control in the Access Network, Mar. 2006.

3GPP2 C.S0063-0 v1.0, cdma2000 High Rate Packet Data Supplemental Services, Mar. 2005.

3GPP2 C.S0024-A, Version 2.0, cdma2000 High Rate Packet Data Air Interface Specification, Jul. 2005.

3GPP2 C.R1001-E, Version 1.0, Administration of Parameter Value Assignments for cdma2000 Spread Spectrum Standards, Sep. 30, 2005.

\* cited by examiner

| Information Element | Element Direction | Type |
|---|---|---|
| A11 Message Type | PDSN -> PCF | Mandatory |
| Reserved <3 octets> | PDSN -> PCF | Mandatory |
| Home Address | PDSN -> PCF | Mandatory |
| Home Agent | PDSN -> PCF | Mandatory |
| Identification | PDSN -> PCF | Mandatory |
| Session Specific Extension | PDSN -> PCF | Mandatory |
| Normal Vendor/Organization Specific Extension | PDSN ->PCF | Optional Conditional |
| Registration Update Authentication Extension | PDSN -> PCF | Mandatory |

FIG. 8

| 0 | 1 | 2 | 3 | 4 | 5 | 6 | 7 | Octet |
|---|---|---|---|---|---|---|---|---|
| ⇒ Message Type = [16H] | | | | | | | | 1 |
| (MSB) | ⇒ Reserved = [00 00 00H] | | | | | | | 1 |
| | | | | | | | | 2 |
| | | | | | | | (LSB) | 3 |
| (MSB) | ⇒ Home Address = [00 00 00 00H] | | | | | | | 1 |
| | | | | | | | | 2 |
| | | | | | | | | 3 |
| | | | | | | | (LSB) | 4 |
| (MSB) | ⇒ Home Agent = <any value> | | | | | | | 1 |
| | | | | | | | | 2 |
| | | | | | | | | 3 |
| | | | | | | | (LSB) | 4 |
| (MSB) | ⇒ Identification = <any value> | | | | | | | 1 |
| | | | | | | | | 2 |
| | | | | | | | | 3 |
| | | | | | | | | 4 |
| | | | | | | | | 5 |
| | | | | | | | | 6 |
| | | | | | | | | 7 |
| | | | | | | | (LSB) | 8 |
| ⇒ Session Specific Extension: Type = [27H] | | | | | | | | 1 |
| Length = [13H – 15H] | | | | | | | | 2 |
| (MSB) | Protocol Type = [88 81H] | | | | | | | 3 |
| | | | | | | | (LSB) | 4 |
| (MSB) | Key = <any value> | | | | | | | 5 |
| | | | | | | | | 6 |
| | | | | | | | | 7 |
| | | | | | | | (LSB) | 8 |
| Reserved = [00H] | | | | | | | | 9 |

FIG. 9A

| | | |
|---|---|---|
| Reserved = [0000 00] | Session ID Ver = ['00' (Version 0), '01' (Version 1)] | 10 |
| (MSB)    MN Session Reference Id = [00 01H - 00 07H] | | 11 |
| (LSB) | | 12 |
| (MSB)    MSID Type = [00 06H] (IMSI) | | 13 |
| (LSB) | | 14 |
| MSID Length = [06-08H] (10-15 digits) | | 15 |
| Identity Digit 1 = [0H-9H] (BCD) | Odd/Even Indicator = [0000, 0001] | 16 |
| Identity Digit 3 = [0H-9H] (BCD) | Identity Digit 2 = [0H-9H] (BCD) | 17 |
| ... | ... | ... |
| If (Odd/Even Indicator = 0000 (even)) {Identity Digit N+1 = [FH] (BCD)} ELSE (If Odd/Even Indicator = 0001 (odd)) {Identity Digit N+1 = [0H-9H] (BCD)} | Identity Digit N = [0H-9H] (BCD) | K |
| ⇒ Normal Vendor/Organization Specific Extension: Type = [86H] | | . 1 |
| Length = <any value> | | 2 |
| (MSB)    Reserved = [00 00H] | | 3 |
| (LSB) | | 4 |
| (MSB)    3GPP2 Vendor ID = [00 00 15 9FH] | | 5 |
| | | 6 |
| | | 7 |
| (LSB) | | 8 |
| Application Type = [ 0DH (QoS Information)] | | 10 |
| Application Sub Type = [FEH - FFH] | | 11 |
| *IF (Application Sub Type = FEH (Forward QoS Update Information)){1:* | | |
| Forward Flow Count = [1 – 31] | Reserved | 12 |
| *Forward Flow Entry { Forward Flow Count :* | | |
| Forward Flow ID = [00H - FFH] | | N |
| Forward Updated QoS Sub-Blob Length = [variable] | | p+1 |
| (MSB)    Forward Updated QoS Sub-Blob = <any value> | | p+2 |
| ... | | ... |
| (LSB) | | Q |
| *} Forward Flow Entry* | | |
| *} Application Sub Type = FEH; ELSE IF (Application Sub Type = FFH (Reverse QoS Update Information)){1:* | | |

FIG. 9B

| | | |
|---|---|---|
| Reverse Flow Count = [1 – 31] | Reserved | 13 |
| *Reverse Flow Entry { Reverse Flow Count :* | | |
| Reverse Flow ID = [00H - FFH] | | N |
| Reverse Updated QoS Sub-Blob Length = [variable] | | p+1 |
| (MSB) ⁞ Reverse Updated QoS Sub-Blob = <any value> | | p+2 |
| ... | | ... |
| | ⁞ (LSB) | Q |
| *} Reverse Flow Entry* | | |
| *} Application Sub Type = FFH* | | |
| *} Application Type = 0DH* | | |
| ⇒ Registration Update Authentication Extension: Type = [28H] | | 1 |
| Length = [14H] | | 2 |
| (MSB) ⁞ SPI = [00 00 01 00H to FF FF FF FFH] | | 3 |
| | | 4 |
| | | 5 |
| | ⁞ (LSB) | 6 |
| (MSB) ⁞ Authenticator = <any value > (keyed-MD-5 authentication) | | 7 |
| | | 8 |
| | | 9 |
| ... | | ... |
| | ⁞ (LSB) | 22 |

FIG. 9C

| Information Element | Element Direction | Type |
|---|---|---|
| A11 Message Type | PCF -> PDSN | Mandatory |
| Reserved <2 octets> | PCF -> PDSN | Mandatory |
| Status | PCF -> PDSN | Mandatory |
| Home Address | PCF -> PDSN | Mandatory |
| Care-of-Address | PCF -> PDSN | Mandatory |
| Identification | PCF -> PDSN | Mandatory |
| Session Specific Extension | PCF -> PDSN | Mandatory |
| Registration Update Authentication Extension | PCF -> PDSN | Mandatory |

| 0 | 1 | 2 | 3 | 4 | 5 | 6 | 7 | Octet |
|---|---|---|---|---|---|---|---|---|
| ⇒ Message Type = [17H] ||||||||  1 |
| ⇒ Reserved = [00 00H] |||||||| 1 |
| |||||||| 2 |
| ⇒ Status = <br>[00H (Update Accepted) <br>80H (Update Denied – reason unspecified) <br>83H (Update Denied – sending node failed authentication) <br>85H (Update Denied – identification mismatch) <br>86H (Update Denied – poorly formed registration update) <br>C9H (Update Denied – session parameters not updated) <br>FDH (Update Denied – ProfileID not supported) <br>FEH (Update Denied - Insufficient Resource) <br>FFH (Update Denied - Handoff in Progress)] |||||||| 1 |
| (MSB) | ⇒ Home Address = [00 00 00 00H] ||||||| 1 |
| |||||||| 2 |
| |||||||| 3 |
| ||||||| (LSB) | 4 |
| (MSB) | ⇒ Care-of-Address = <any value> ||||||| 1 |
| |||||||| 2 |
| |||||||| 3 |
| ||||||| (LSB) | 4 |
| (MSB) | ⇒ Identification = <any value> ||||||| 1 |
| |||||||| 2 |
| |||||||| 3 |
| |||||||| 4 |
| |||||||| 5 |
| |||||||| 6 |
| |||||||| 7 |
| ||||||| (LSB) | 8 |

FIG. 11A

| | | |
|---|---|---|
| ⇒ Session Specific Extension: Type = [27H] | | 1 |
| Length = [13H – 15H] | | 2 |
| (MSB) Protocol Type = [88 81H] | | 3 |
| (LSB) | | 4 |
| (MSB) Key = <any value> | | 5 |
| | | 6 |
| | | 7 |
| (LSB) | | 8 |
| Reserved = [00H] | | 9 |
| Reserved = [0000 00] | Session ID Ver = ['00' (Version 0), '01' (Version 1)] | 10 |
| (MSB) MN Session Reference Id = [00 01H – 00 06H] | | 11 |
| (LSB) | | 12 |
| (MSB) MSID Type = [00 06H] (IMSI) | | 13 |
| (LSB) | | 14 |
| MSID Length = [06-08H] (10-15 digits) | | 15 |
| Identity Digit 1 = [0H-9H] (BCD) | Odd/Even Indicator = [0000, 0001] | 16 |
| Identity Digit 3 = [0H-9H] (BCD) | Identity Digit 2 = [0H-9H] (BCD) | 17 |
| ... | ... | ... |
| If (Odd/Even Indicator = 0000 (even)) {Identity Digit N+1 = [FH] (BCD)} Else If (Odd/Even Indicator = 0001 (odd)) {Identity Digit N+1 = [0H-9H] (BCD)} | Identity Digit N = [0H-9H] (BCD) | k |
| ⇒ Registration Update Authentication Extension: Type = [28H] | | 1 |
| Length = [14H] | | 2 |
| (MSB) SPI = [00 00 01 00H to FF FF FF FFH] | | 3 |
| | | 4 |
| | | 5 |
| (LSB) | | 6 |
| (MSB) Authenticator = <any value > (keyed-MD-5 authentication) | | 7 |
| | | 8 |
| | | 9 |
| ... | | ... |
| (LSB) | | 22 |

FIG. 11B

| Message Element | Setting |
|---|---|
| Application Type 0BH (PCF Enabled Features): Application Sub Type 02H (GRE Segment Enabled and 01H Short Data Indication Supported) | This Application type may not be included. |
| Additional Session Information: Source IP Address: | This field can be set to the source IP address of the A11-Registration Request message. |
| Forward QoS Information: DSCP Included | 0 |
| Forward QoS Information: DSCP | 000000, This field can be ignored by the PDSN. |

FIG. 12

| Message Element | Setting |
|---|---|
| Application Type 0AH (PDSN Enabled Features): Application Sub Type 02H (Packet Boundary Enabled) | This Application sub-type may not be included. |

FIG. 13

| Field | Length (bits) |
|---|---|
| NUM_QoS_ATTRIBUTE_SETS | 3 |

NUM_QoS_ATTRIBUTE_SETS (occurrences of the following record)
{

| | |
|---|---|
| QoS_ATTRIBUTE_SET_LEN | 4 |
| QoS_ATTRIBUTE_SET | 8× QoS_ATTRIBUTE_SET_LEN |

}

| | |
|---|---|
| Reserved | 0-7 bits (as needed) |

FIG. 14

| Field | Length (bits) |
|---|---|
| QoS_ATTRIBUTE_SET_ID | 7 |
| VERBOSE | 0 |
| FlowProfileID | 16 (if present) |

FIG. 15

QUALITY OF SERVICE UPDATE PROCEDURE

CROSS-REFERENCE TO RELATED APPLICATION

This application claims the benefit under 35 U.S.C. §119 (e) of U.S. Provisional Patent Application No. 60/705,983, filed Aug. 5, 2005, U.S. Provisional Patent Application No. 60/707,363, filed Aug. 11, 2005, and U.S. Provisional Patent Application No. 60/740,733, filed Nov. 30, 2005, each of which is hereby incorporated by reference herein in its entirety.

FIELD OF THE INVENTION

The present invention relates to the field of wireless communication systems. More particularly, this invention relates to performing quality of service (QoS) updates on Internet Protocol (IP) flows.

BACKGROUND OF THE INVENTION

Wireless communication systems and networks are used in connection with many applications, including, for example, satellite communications systems, portable digital assistants (PDAs), laptop computers, portable communication devices (e.g., cellular telephones), nodes that change their point of attachment to a network, and non-mobile network nodes. The term Access Terminal (AT) can be used to refer to such applications. The AT may be, for example, a device itself, or alternatively, software running on an appropriate system. A correspondent node (CN) is a node that sends or receives packets to an AT. A CN can simply be a second AT that is in communication with a first AT. A connection between an AT and a CN, through a network, can have a quality of service (QoS) associated with it. QoS is a measure of the service quality provided to an application. More specifically, QoS is a measure of the service quality provided to a connection between an AT and a CN, through a network. In the Internet protocol (IP) environment, this relates to the possible levels of quality of an IP flow, including, for example, bandwidth guarantees, latency, packet ordering, and other related levels of service. Specifically, when an IP flow is granted a certain level of QoS, this signifies that the network will guarantee that packets in the flow receive specific minimum levels of service. An IP flow that is not granted any level of QoS is not guaranteed any minimal level of service and instead the network provides only its best effort.

Providing QoS to an IP flow requires a certain amount of network resources. As networks do not have unlimited resources, every IP flow cannot necessarily obtain the QoS it desires, or even obtain any minimum level of QoS. For the transfer of a single image file, for example, having a lower level of QoS than desired may simply mean that the file is correctly transferred but that the transfer takes longer than the user would prefer. More severely, for example, if an IP Flow for streaming video is not granted its required level of QoS, this may mean that the user cannot use the streaming video at all. Conversely, it is possible that an IP flow might have a higher level of QoS than it requires. A situation like this wastes system resources and may limit the availability of connections in the network to services that require that higher level of QoS.

SUMMARY OF THE INVENTION

It is desirable to be able to perform Quality of Service (QoS) update procedures to modify the QoS grant for an IP flow. This update may be done, for example, by a packet-processing node, such as a packet data serving node (PDSN), and a packet control function (PCF). It would be of benefit to have the capability to downgrade the granted QoS for a specific IP flow having a higher QoS than it needs, and the capability to upgrade the granted QoS for an IP flow needing more capacity. The systems and methods of the present invention provide these capabilities to a network. More specifically, the systems and methods of the present invention enable a QoS grant to be updated from any level of QoS to any other level of QoS, from no level of QoS to some level of QoS, and from some level of QoS to no level of QoS.

The systems and methods of the present invention enable a request to be made to update the level of QoS for an IP flow. This IP flow can be, for example, an existing IP flow or an IP flow that is being established. The network processes this request, decides whether to grant or not grant the request, and then, depending on the decision, updates, if required, the QoS for the flow. The systems and methods of the present invention also handle various error cases that may occur during the process of updating a QoS level.

In one embodiment of the present invention, systems and methods are provided for updating the quality of service of an IP flow, wherein the IP flow is between an access terminal and a correspondent node, through a network that is in communication with a packet data serving node. A request to update the quality of service of the IP flow can be received and decision can be made whether to update the quality of service. If a decision is made to update the quality of service of the IP flow, an update message can be sent from the packet data serving node to the access network. An acknowledgment of the update message can be sent from the access network to the packet data serving node. The access network can grant the new quality of service for the IP flow. This new quality of service can include any level of quality of service, including no minimum level of quality of service. A registration request message can be sent from the access network to the packet data serving node. A reply, to the registration request message, can be sent from the packet data serving node to the access network.

BRIEF DESCRIPTION OF THE DRAWINGS

The above and other advantages of the present invention will be apparent upon consideration of the following detailed description, taken in conjunction with accompanying drawings, in which like reference characters refer to like parts throughout, and in which:

FIG. 8 is a description of the contents of the A-11 session update message used in an example of the present invention;

FIG. 9A is a detailed description of the contents of the A-11 session update message used in an example of the present invention;

FIG. 9B is a detailed description of the contents of the A-11 session update message used in an example of the present invention;

FIG. 9C is a detailed description of the contents of the A-11 session update message used in an example of the present invention;

FIG. 10 is a description of the contents of the A-11 session update acknowledge message used in an example of the present invention;

FIG. 11A is a detailed description of the contents of the A-11 session update acknowledge message used in an example of the present invention;

FIG. 11B is a detailed description of the contents of the A-11 session update acknowledge message used in an example of the present invention;

FIG. 12 is a description of the contents of the A-11 Registration Request message used in an example of the present invention;

FIG. 13 is a description of the contents of the A-11 Registration Reply message used in an example of the present invention;

FIG. 14 is a detailed description of the contents of the Forward/Reverse Update QoS Sub_Blob format used in an example of the present invention; and FIG. 15 is a detailed description of the part of the contents of the Forward/Reverse Update QoS Sub_Blob format used in an example of the present invention.

DETAILED DESCRIPTION OF THE INVENTION

In the following description, numerous specific details are set forth regarding the methods and systems of the present invention and the environment in which such methods and systems may operate, etc., in order to provide a thorough understanding of the present invention. It will be apparent to one practiced in the field, however, that the present invention may be practiced without such specific details, and that certain features which are well known in the art are not described in detail in order to avoid complication of the subject matter of the present invention. In addition, it will be understood that the examples provided below are exemplary, and that it is contemplated that there are other methods and systems that are within the scope of the present invention.

Some embodiments of the systems and methods of the present invention update the quality of service (QoS) for an Internet packet (IP) flow. It is desirable for a network to be able to perform QoS update procedures to modify a QoS grant for an IP flow. Specifically, it is desirable to have the capability to both downgrade the granted QoS for a specific IP flow and the capability to upgrade the granted QoS for a specific IP flow. It should be noted that these updates can also be performed on a group of IP flows. The present invention allows networks to offer such differentiated and changeable QoS enabled services.

When a new IP flow is set up between an access terminal (AT) and a correspondent node (CN), through an access network (AN), the flow might be granted a QoS in the AN. It is also possible that when a new IP flow is set up, it is given no QoS in the AN. The systems and methods of the present invention are capable of changing the QoS from any level to any other level. They are also capable of granting QoS to a flow that does not have any level of QoS, and are capable of removing a QoS grant from an IP flow that currently has a level of QoS.

Figure 2:
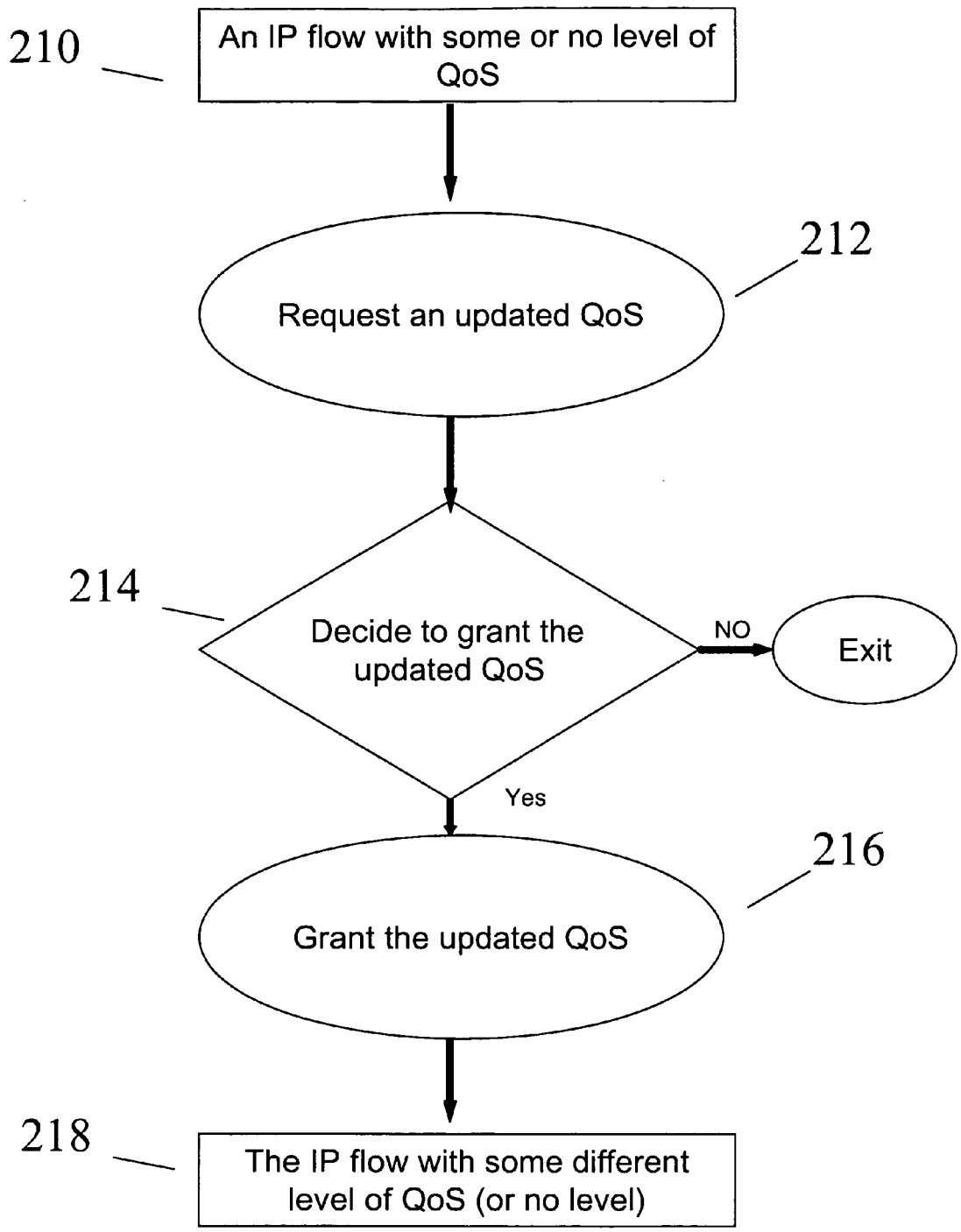
FIG. 2 shows a simplified flowchart of the process of performing a QoS update.

FIG. 2 is a simplified illustration of a method of the present invention. Consider an IP flow with some or no level of QoS at 210. The update procedure starts with a request, step 212, to update the QoS for an IP flow. This request can come from the AT with which the IP flow is associated, or it can come from another source, for example, a policy function in the network. A decision, at step 214, is made whether to update the QoS. This decision may be made based on network policy in a packet-processing node, such as a PDSN, or can be made dynamically by an external source, such as, for example, a remote server or policy function. If it is decided to continue with the update, the update to the QoS is made at 216 and, upon completion, the IP flow has a new level of QoS at 218. If it is decided not to continue with the update, the network may take no further action and simply leave the IP flow as is.

Figure 1:
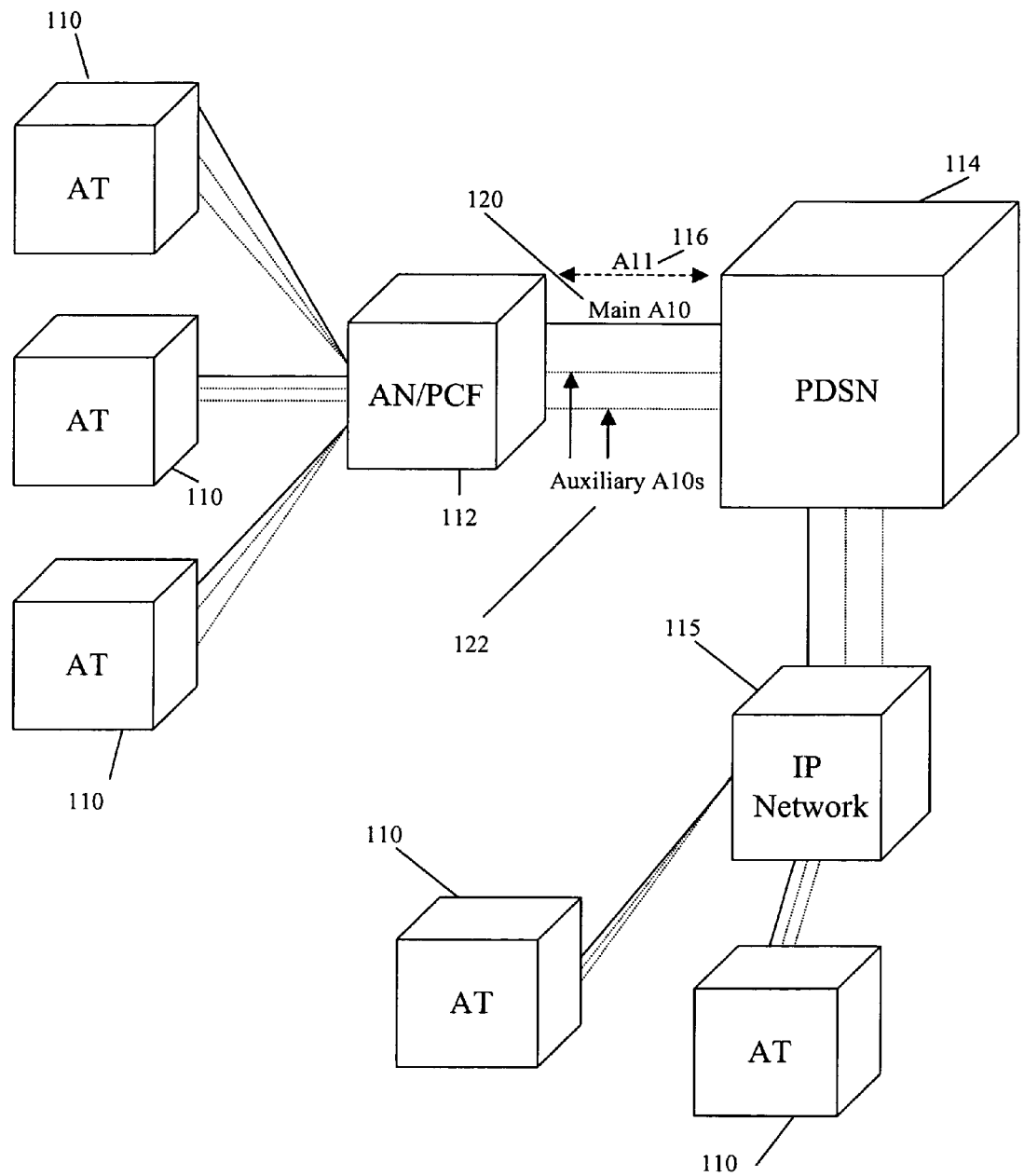
FIG. 1 is a schematic diagram of a network used in accordance with certain embodiments of the present invention.

Two possible updates, an upgrade from no QoS to some level of QoS and a downgrade from some level of QoS to no QoS will be described below. The network illustrated in FIG. 1 is used to describe these example call flows. FIG. 1 illustrates part of a network, for example, part of a Code Division Multiple Access (CDMA) network, suitable for use with embodiments of the systems and methods of the present invention. This description and the accompanying figures will often refer to a combination of the access network (AN) and the packet control function PCF as the AN/PCF. This combination label simplifies the diagrams and discussion below, by showing the PCF as part of the AN. FIG. 1 includes the AT 110, the AN/PCF 112, and the PDSN 114. It should be noted that many ATs 110 can be in communication with the AN/PCF 112 and that the PDSN 114 may be in communication with an additional network or networks 115 and with additional ATs 110 through those additional networks. In some configurations, an additional network 115 may be an AN/PCF 112, though any suitable network can be used. The communication protocols used are the A11 116 and A10 120/122 protocols. A11 is a defined protocol of the Third Generation Partnership Project 2 (3GPP2) defined in spec number A.S0008-A and is a control portion of an interface between the PCF and the PDSN. A10 is the subscriber data portion of the interface that exists between the PCF and the PDSN in the CDMA network of FIG. 1. A10 is based on generic routing encapsulation (GRE) as defined in RFC-2784 and IP encapsulation within IP as defined in RFC-20032. The example CDMA network of FIG. 1 can be a CDMA2000 network, which is a version of the IMT-2000 standard developed by the International Telecommunication Union (ITU). The CDMA2000 network is third-generation (3-G) mobile wireless technology. The use of the mentioned protocols and the CDMA network are just one possible implementation of the present invention. The systems and methods of the present invention may be implemented using other network types and use other protocols. Various embodiments of the present invention may use, for example, Worldwide Interoperability for Microwave Access (WiMax), 3rd Generation Partnership Project (3GPP), or Telecoms and Internet converged Services and Protocols for Advanced Networks (TISPAN). Furthermore, the examples given below are meant only as illustrative examples of two possible updates of QoS. It should be noted that various message formats will be discussed below in the description of the QoS update procedures. Details of these messages and their formats are illustrated in FIGS. 8-15 and will be discussed at the end of this description. It should also be noted that various embodiments of the systems and methods of the present invention can use additional message formats or alter the formats of FIGS. 8-15.

Figure 3:
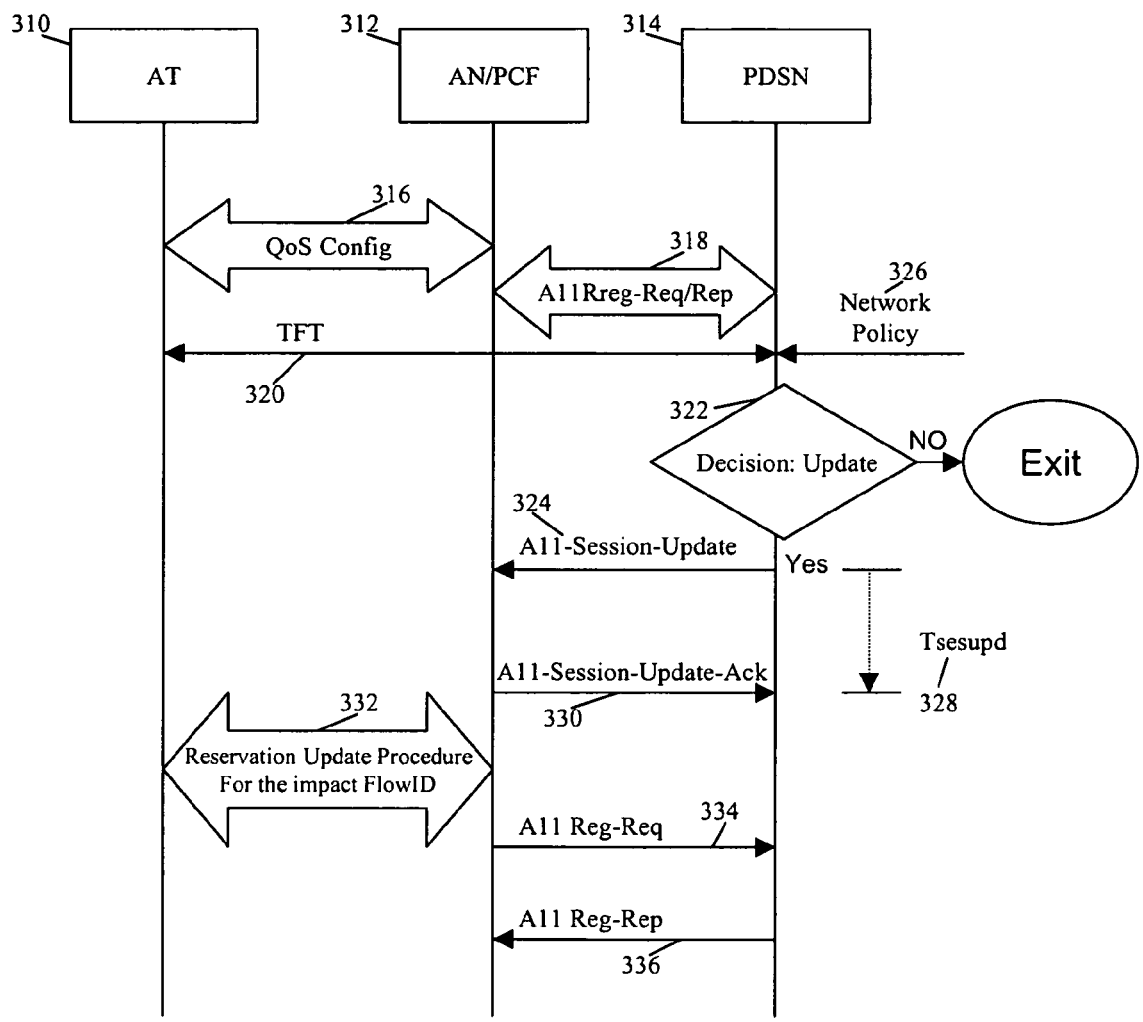
FIG. 3 is a detailed example of a successful QoS downgrade.

In some embodiments of the systems and methods of the present invention an IP flow may have its level of QoS downgraded from some level of QoS to no level of QoS. Referring to FIG. 3, an IP flow between the AT 310 and a CN, through the AN 312 is new and the AN grants a level of QoS to the flow as requested by, for example, high rate packet data over-the-air (HRPD OTA) procedures 316. The PCF then sends the IP flow information, step 318, such as FlowID and Requested and Granted QoS information to the PDSN 314 as an A11 protocol message.

At some point in time, it might become desirable to update the QoS for the IP flow. This may take place, at the instigation of the AT, with a traffic flow template (TFT) operation, at 320, between the AT and the PDSN. It should be noted, that a server or node apart from the AT being updated, may also instigate updateing the QoS for the AT. That is, the update may be requested by either the AT or by another device, for example, a network policy signal 326 from a server or node. It should also be noted that the TFT operation, at step 320, may take place in parallel with steps 316 and 318.

The PDSN analyzes the traffic flow template (TFT), the granted QoS, the requested QoS, and the flow mapping information, and decides, at 322, whether to downgrade the granted QoS for the particular IP flow. The PDSN may also send an accounting request start to a Remote Authenticaion Dial-In Service User Service (RADIUS) server to inform it about the change forthcoming in the IP flow.

The PDSN then sends an update message using A11-session protocol, step 324, to the PCF with updated QoS information. Alternatively, the PDSN may send the A11-session update message 324, dependent on whether the flow information was received at 318. The format of this update message is illustrated in FIGS. 8-11 and will be discussed later. The PDSN includes a timestamp, the particular FlowID in the Forward and/or Reverse Update QoS Sub_Blob and sets the FlowProfileID to 0×0000. The format for the Sub_Blob will be discussed later and is illustrated in FIG. 14. At this point, the PDSN starts a timer called $T_{sesupd}$ 328 and puts the state of the flow in downgrade pending mode. It then waits for downgrade confirmation from the PCF. During this waiting time, the IP packets continue to be passed on in the normal fashion, for example, by mapping the flow to the appropriate A10 connection. The procedure to handle the case of $T_{sesupd}$ 328 expiring will be discussed later.

Upon receiving the update message from the PDSN, with the updated QoS information, the PCF responds to the PDSN with an A11 session update acknowledge message 330 that indicates that the update was accepted. This acknowledge message is illustrated in FIGS. 11A and 11B and will be discussed later. In this case, the status code in the message is set to "00H" to indicate that update was accepted. Upon receiving the update acknowledge message, the PDSN stops the $T_{sesupd}$ 328 timer. For the time being, the PDSN maintains the flow state in the downgrade pending mode.

At this point the AN performs procedures 332 to de-grant resources allocated for the IP flow. These procedures may be done using HRPD over the air signaling.

When the flow reservation removal procedure is complete between the AT and the AN, the PCF sends an A11 registration request message 334 to the PDSN. This request message is illustrated in FIG. 12 and will be discussed later. If the flow was downgraded in an active state, the message includes an airlink record in the application type set to "01H" and an Airlink-Stop (Accounting) in the Critical Vendor-Specific Extensions (CVSE) set to "26H". The registration request message also includes the additional Normal Vendor Specific Extension (NVSE) session information for any remaining auxiliary A10 connections and the QoS NVSE information for any remaining IP flows for the session. The downgraded flow information is not present in the QoS information element in this message. If the downgraded IP flow was the only IPI flow that was mapped to the associated A10, the additional session information will not include that A10 information. Upon receiving the registration request message with the information confirming the AN's action, the PDSN can delete the flow information from the TFT or it may keep the information for future use, such as, for example, re-initiating the same flow.

The PDSN sends an A11 registration reply message 336 to the PCF to acknowledge the receipt of the registration request message. This reply message is illustrated in FIG. 13 and will be discussed below. This message will include an application type of "0CH" in the additional session information to acknowledge the receipt of the A11 registration request message. The additional session information only contains the information of the remaining A10 connections. It should be noted that if the flow that is being downgraded is the only flow on an A10, that A10 can be torn down after the flow is downgraded.

It should also be noted that systems and methods of the present invention can be applied to various QoS update scenarios. For example, the PDSN can downgrade a reverse direction flow if the AT does not send at reverse TFT. In this case, the PDSN can run a timer, $T_{qosupd}$, before sending an All-Session update message, at 324, to downgrade the flow. If a corresponding packet filter is received from the AT 310 before this timer expires, the PDSN stops the timer and can perform normal TFT processing. It should also be noted that the PDSN can decide to downgrade an IP flow after analyzing a received packet filter (e.g., a TFT).

Figure 4:
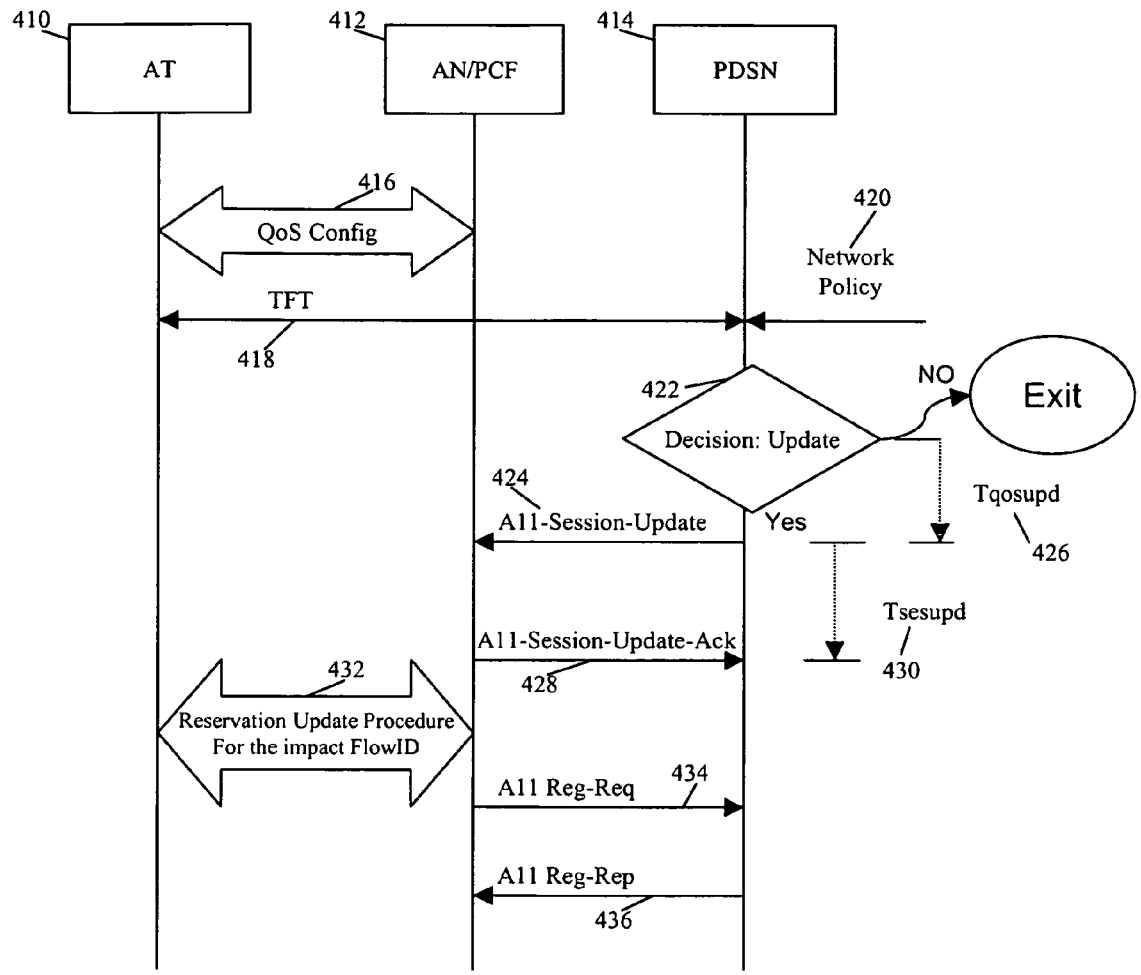
FIG. 4 is a detailed example of a successful QoS upgrade.

In other embodiments of the systems and methods of the present invention, an IP flow may have its level of QoS upgraded from no level of QoS to some level of QoS. Referring to FIG. 4, it is possible that when the AT requests a level of QoS for a new IP flow, step 416, that the AN stores the requested QoS Sub_BLOB, but does not grant the reservation for the flow. This may happen because, for example, the user's QoS profile does not include the requested QoS profileID. In this case, the IP flow initially has no QoS associated with it and an update process may be initiated by the AT. This may take place with a TFT operation, step 418, between the AT 410 and the PDSN 414. A server or node, apart from the AT, might also instigate the update of QoS, for example, with a network policy signal 420.

The PDSN analyzes the TFT and decides, at step 422, whether to grant the QoS for the IP flow and start a timer $T_{qosupd}$ 426.

When the $T_{qosupd}$ timer expires, and an update is to be effected, the PDSN sends an A11 session update message 424 to the PCF 412. The update message contains the FlowID of the flow that is being upgraded and a timestamp. The PDSN includes the particular FlowID in the Forward or Reverse Updated QoS Sub_Blob and also sets the profileID to the upgraded (granted) profileID. Upon sending the session update message, the PDSN starts a timer $T_{sesupd}$ 430 and begins waiting for the upgrade confirmation by placing the state of the flow in upgrade pending mode. During this waiting period, the PDSN will continue to pass IP packets in the normal fashion if the flow is a normal direction flow, by, for example, mapping the IP Flow to the main A10.

Upon receiving the A11 session update message, at step 424, from the PDSN with updated QoS information, the PCF responds to the PDSN with an A11 session update acknowledge message 428. In this case, the status code in the message is set to "00H" to indicate the update has been accepted. When the PDSN receives the update acknowledge message it stops the $T_{sesupd}$ timer. The procedure to handle the case of $T_{sesupd}$ 328 expiring will be discussed later. For the time being, the PDSN maintains the flow state in the upgrade pending mode.

While in upgrade pending mode, the PDSN continues to map any IP packets to the main A10 connection.

The AN grants, at step 432, a QoS increase for the IP flow using, for example, HRPD OTA procedures as described above.

When the flow reservation is granted by the AN, the PCF sends an A11 registration request message 434 to the PDSN. In this message, the PCF includes the additional session information NVSE for all the auxiliary A10 connections and the QoS information NVSE for all the flows including updated QoS information for the upgraded flow. When the PDSN receives this message, it sends, an accounting request start to the RADIUS server to inform it that the IP flow has been granted and admitted (i.e. the IP flow can be included in a QoS scheduling function in the AN and will thus get some guaranteed minimum level of QoS in the AN). The PDSN removes the upgrade pending status on the flow and begins normal flow mapping operation. If the flow is a forward direction flow, for example, it maps the IP flow to the corresponding A10 connection.

The PDSN then sends an A11 registration reply message 436 to the AN. This message includes the application type of "0CH" of additional session information to acknowledge the receipt of the registration request message of step 434. The additional session information only contains the information of the remaining A10 connections.

The methods and systems of the present invention also account for failures among at least one of the previous steps. These failures are handled as discussed below.

Figure 5:
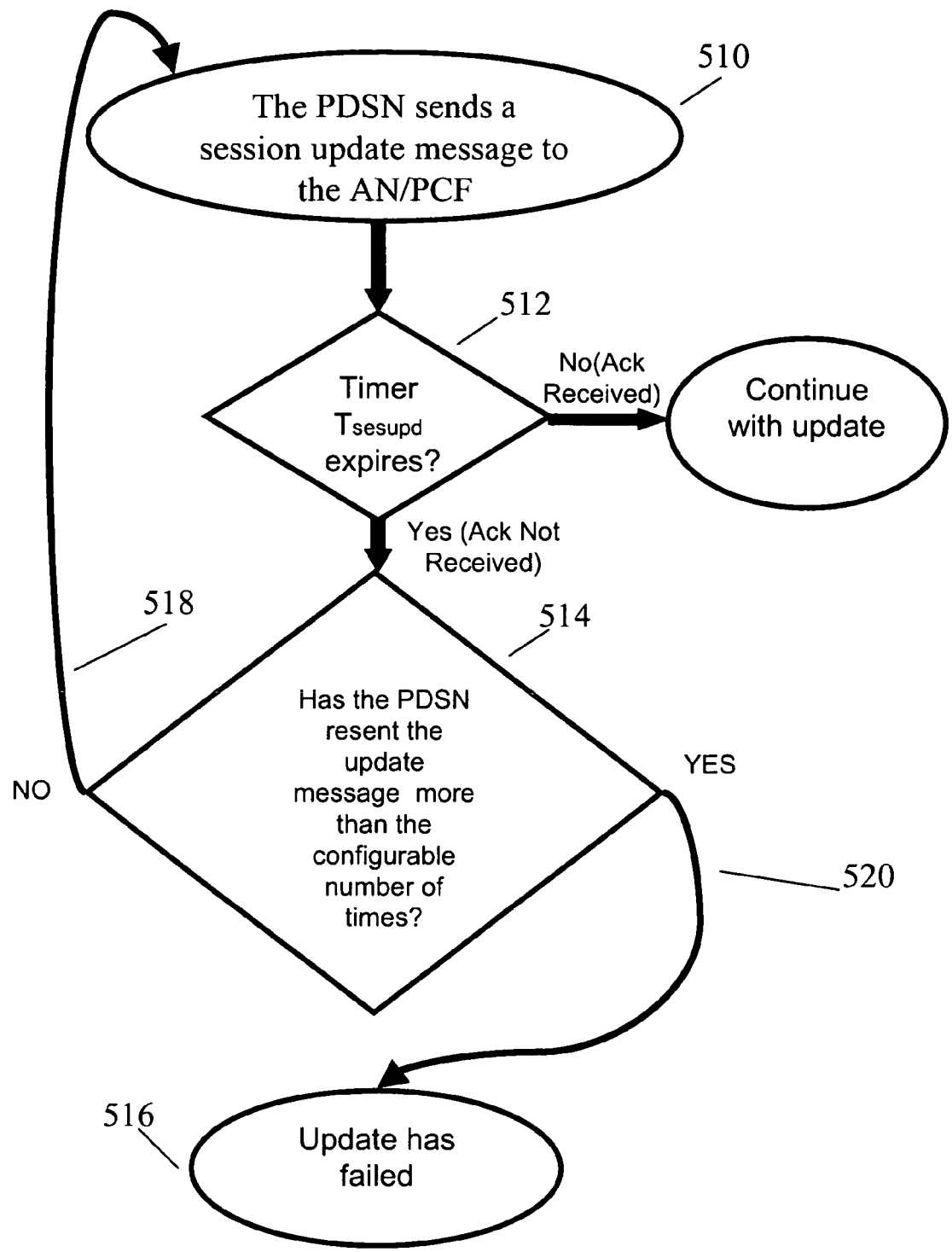
FIG. 5 is a simplified flow chart of an error case that may occur during a QoS update.

One possible scenario, which is illustrated in FIG. 5, is that the PDSN sends a session update message 510, which includes a timestamp, to the PCF, but no valid update acknowledge message is seen before the timer $T_{sesupd}$ expires 512. In this case, the PDSN retransmits the QoS update message with the same update information, but with a new timestamp, to the PCF. The PDSN will continue to resend 518 the update message if timer $T_{sesupd}$ expires until it has resent the message a configurable number of times at 520. If this number is reached the PDSN will consider the update to have failed 516, will log the event, and will continue to perform normal operations for the flow.

Figure 6:
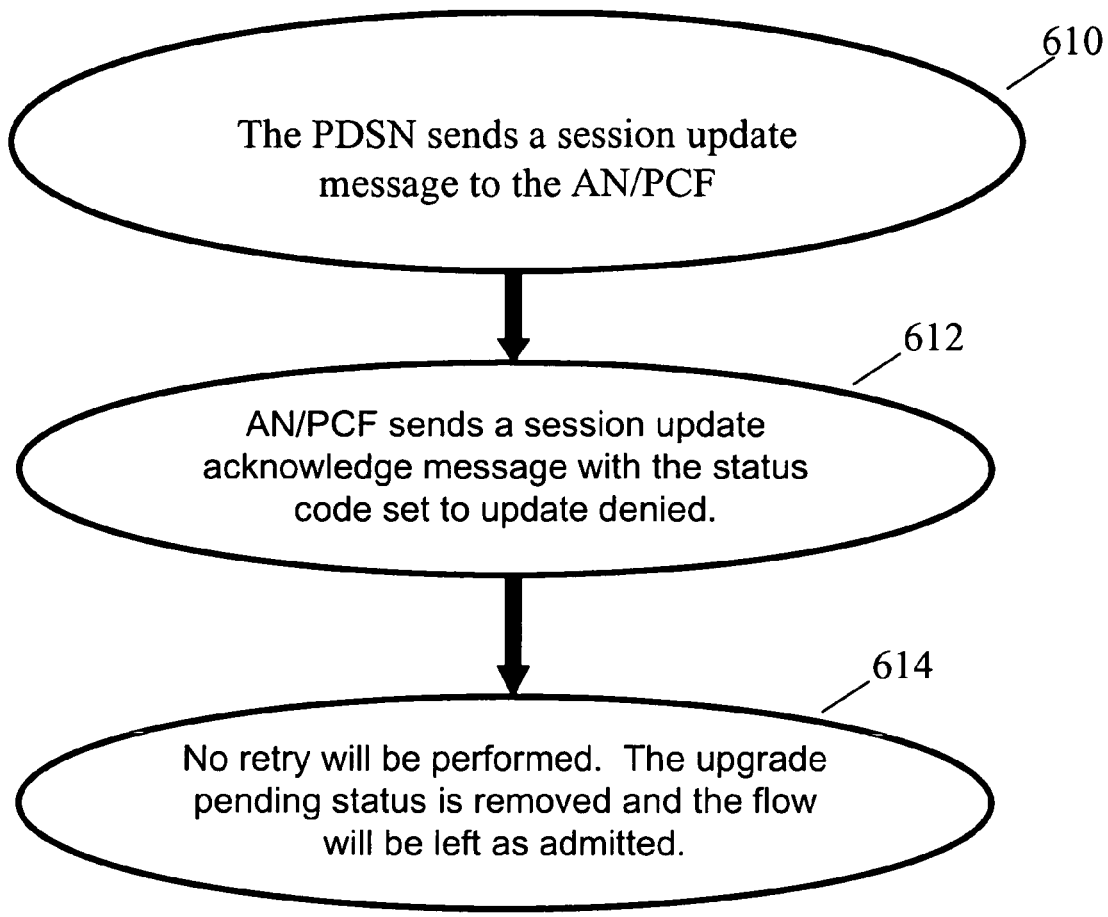
FIG. 6 is a simplified flow chart of an error case that may occur during a QoS update.

Another possible scenario is illustrated in FIG. 6. The PDSN sends a session update message to the AN/PCF at 610, but the AN is not able to support the upgraded level of QoS for the profileID specified in the session update message. In this case the AN sends back an update acknowledge message at 612 to the PDSN with a status code indicating the update was denied because the profile ID was not supported. Upon receiving this status code, the PDSN does not try to update the QoS for the flow. It leaves the flow as admitted at 614 and removes the upgrade pending status. Other cases involving the AN denying the update are be handled in the same way and the status code sent to the PDSN indicates the reason for denial. Two such examples are an indication of insufficient resources and an indication that a handoff is in progress.

Figure 7:
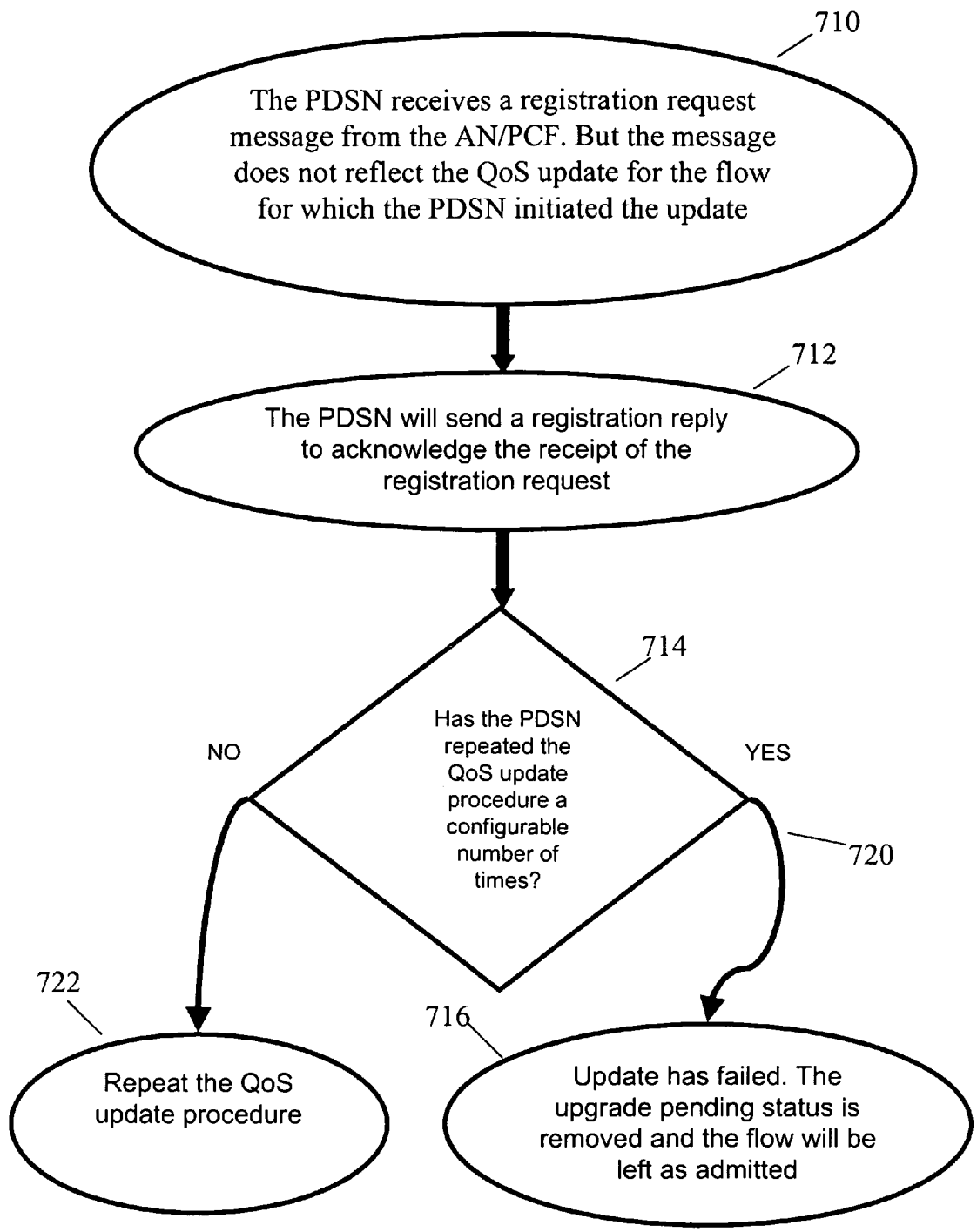
FIG. 7 is a simplified flow chart of an error case that may occur during a QoS update.

Yet another possible scenario, which is illustrated in FIG. 7, is that the PDSN receives a registration request message at 710 from the PCF subsequent to receiving a session update acknowledge having an update accepted status. However, the registration request does not reflect the QoS update for the flow for which the PDSN initiated the update. To recover from this scenario, the PDSN sends a registration reply, at 712, to acknowledge the receipt of the registration request. The PDSN then checks, at 714, how many times the update procedure has been attempted thus far. The PDSN will repeat, at 722, the QoS update procedure for the remainder of a maximum configurable number of times, and after the configurable number of times, if a registration request has not reflected the updated QoS information for the IP flow, the PDSN logs the event as failed at 716 and keep the IP flow as admitted. It should be noted that, in a preferred embodiment, the configurable number of times is one.

As discussed above, the systems and methods of the present invention use various message formats. Specifically, these message formats may be used in the example call flows described in FIGS. 2-4. It should be noted that it is possible that the invention could be practiced without these details and that it is also possible that, using different formats or protocols than the ones described below and in the accompanying figures, one could still practice the present invention.

In order to update the QoS for a flow, the illustrated PDSN uses the A11-Session Update message as defined in FIG. 8, FIG. 9A, FIG. 9B, and FIG. 9C. The message contains the elements listed in FIG. 8 and the bitmap layout described in FIG. 9A, FIG. 9B, and FIG. 9C. The reserved field 810 is set to zero by the PDSN and ignored by the PCF. The Normal Vendor/Organization Specific Extension 820 is used by the PDSN to provide a Radio Network Packet Data Inactivity Timer (RN-PDIT) value to the PCF. Also in 820, when an Always-on Indicator is present at the PDSN, the PDSN includes the Normal Vendor Specific Extension (NVSE) with an Always-on Indicator.

The forward and reverse update QoS Sub_Blob format is illustrated in FIG. 14. It should be noted that the "Reserved" field of the QoS Sub_Blob can include a number of "0" bits to make the U_QoS Sub_Blob an integer number of octets. The field NUM_QoS_ATTRIBUTE_SETS defines the number of QoS_ATTRIBUTE_SETS. The PDSN sets NUM_QoS_ATTRIBUTE_SETS to one less than the number of alternative QoS attributes sets to which the AN should upgrade the flow. The alternative QoS attributes sets can be included in the updated QoS Sub_Blob. QoS_ATTRIBUTE_SET_LEN defines the length of QoS_ATTRIBUTE_SET and the PDSN sets QoS_ATTRIBUTE_SET_LEN to the length, in octets, of the QoS_ATTRIBUTE_SET. QoS_ATTRIBUTE_SET, illustrated in FIG. 15, contains the updated QoS parameters for the IP flow. The PDSN sets QoS_ATTRIBUTE_SET_ID, the first parameter, to an identifier for the QoS_ATTRIBUTE_SET. The second parameter, VERBOSE, indicates whether the third parameter, FlowProfileID, or detailed QoS parameters are included in the QoS_ATTRIBUTE_SET. If a FlowProfileID is included, the PDSN can set this field to '0.' If detailed QoS parameters are included, the PDSN can set this field to '1.' In the example call flows described above, VERBOSE is set to 0. FlowProfileID is the IP Flow's Profile Identifier. If the VERBOSE field is set to '0', the PDSN includes the FlowProfileID and sets it to the upgraded/downgraded FlowProfileID that represents the application using the IP flow. Otherwise, the PDSN omits the FlowProfileID field. In this illustrated implementation, of FIG. 15, only FlowProfileID is used because VERBOSE is set to 0. For the downgrade case, the PDSN sets the FlowProfileID to 0×0000 (Best Effort). Upon receiving a FlowProfileID equal to 0×0000, the AN removes the reservation for the flow. For the upgrade case, the PDSN sets the FlowProfileID to one or a set of values. The value(s) will be based on network policy.

The PCF uses the A11-Sesssion Update Ack as defined in FIG. 10, FIG. 11A, and FIG. 11B to acknowledge the receipt of the A11-Session Update message from the PDSN to update the QoS for an IP flow. The reserved field, 1010, is set to zero by the PCF and ignored by the PDSN.

The A11-Registration Request message has the configuration shown in FIG. 12. The PCF sends the A11-Registration request message to the PDSN with updated QoS information to reflect the action taken by the AN in response to a QoS update procedure from the PDSN. The two possibilities regarding this message are that the QoS update was for an inactive flow, or the QoS update was for an active flow.

If the impacted IP flow is not active when the QoS update procedure is executed, the A11-Registration Request, illustrated in FIG. 12, and sent, for example, at 334 and 434, only contains the NVSE (86H) with Additional Session information (OCH) and the QoS Information (ODH). If the A11-Resgtration Request is sent in response to a downgrade QoS procedure, as illustrated in FIG. 3, the Additional Session Info and the QoS information elements exclude the impacted flowID information. If the impacted flow is the only flow over the associated A11, the Additional Session Information element does not contain the session information of that A10 (A10 tear down). The PCF sends the A11-Registration Request when the updated flow is granted. If the A11-Resgtration Request is sent in response to an upgrade QoS procedure, as illustrated in FIG. 4, the A11-Registration Request includes all the information, including the info for the upgraded FlowID in the Additional Session Information and the QoS information elements to reflect the upgraded QoS info.

If the impacted flow is Active, when the QoS downgrade procedure was executed, as illustrated in FIG. 3, the A11-Registration Request contains the CVSE (26H) with Application Type=01H (Active Stop Accounting record), the NVSE (86H) with Additional Session info (0CH) and the QoS Information (0DH). The Additional Session Info and the QoS Info elements exclude the impacted flowID information. If the impacted flow is the only flow over the associated A11, the Additional Session Info element does not contain the session info of that A10 (A10 tear down).

In some embodiments of the systems and methods of the present invention, the A11-Registration Reply message can have the configuration shown in FIG. 13.

Although the invention has been described and illustrated in the foregoing illustrative embodiments, it is understood that the present disclosure has been made only by way of example, and that numerous changes in the details of implementation of the invention can be made without departing from the spirit and scope of the invention. For example, it will be understood that although the invention has been described with particular reference to CDMA networks, and A11 and A10 protocols, the invention is not limited in this manner. Persons versed in the field will also appreciate, for example, that the call flows described in the foregoing examples can be easily modified to update a level of QoS from any level to any other level. Also, for example, a packet data serving node (PDSN) may be replaced by any appropriate node or device that can perform, for example, packet processing and re-direction. The present invention is limited only by the claims which follow.

What is claimed is:

1. A method comprising:
receiving, at a packet-processing node, an indication from an access network that an update of a quality of service of an existing IP flow for delivering a content between a first access terminal and a second access terminal through the access network is desired, wherein the access network is in communication with the packet-processing node and wherein the quality of service relates to the measure of service quality to an application, the quality of service including one or more of best efforts, bandwidth guarantee, latency guarantee, and packet ordering;

in response to receiving the indication, deciding, at the packet-processing node, whether to update the quality of service of the IP flow based at least in part on available network resources determined from a traffic flow through the packet-processing node;

if a decision is made to update the quality of service of the IP flow, determining new quality of service parameters for the update and sending an update message including the new quality of service parameters from the packet-processing node to the access network;

sending an acknowledgment of the update message, from the access network to the packet-processing node;

granting an update to the quality of service of the IP flow at the access network, wherein the IP flow at the access network includes at least a portion of the IP flow between the first access terminal and the access network;

in response to the update, sending a registration request message from the access network to the packet-processing node, wherein sending the registration request message from the access network to the packet-processing node includes sending updated quality of service information for the IP flow; and sending a reply to the registration request message from the packet-processing node to the access network.

2. The method of claim 1, further comprising basing the update decision at least in part on network policy.

3. The method of claim 1, wherein the update indication includes a request to update the quality of service received from at least one of the first access terminal and the second access terminal, wherein the update decision is based at least in part on the request to update the quality of service.

4. The method of claim 1, wherein the update indication includes a request to update the quality of service received from a remote device, wherein the update decision is based at least in part on the request to update the quality of service.

5. The method of claim 1, wherein the update is a change from any level of quality of service to any other level of quality of service, including no quality of service.

6. The method of claim 1, wherein the IP flow is a group of IP flows.

7. The method of claim 1, further comprising basing the update decision at least in part on network policy.

8. The method of claim 1, wherein the update indication includes a request to update the quality of service received from at least one of the first access terminal and the second access terminal, wherein the update decision is based at least in part on the request to update the quality of service.

9. The method of claim 1, further comprising receiving a request to update the quality of service from a remote device, wherein the update decision is based at least in part on the request to update the quality of service.

10. The method of claim 1, wherein the update is a change from any level of quality of service to any other level of quality of service, including no quality of service.

11. The method of claim 1, wherein the IP flow is a group of IP flows.

12. A wireless communication system comprising:
an access network in communication with a first access terminal and a second access terminal; and
a packet-processing node in communication with the access network for performing packet processing and redirection;
the access network communicating with the first access terminal over at least a portion of an existing IP flow for delivering a content between the first access terminal and the second access terminal, through the access network, wherein the IP flow has a quality of service associated with it, wherein the quality of service relates to the measure of service quality to an application, the quality of service including one or more of best efforts, bandwidth guarantee, latency guarantee, and packet ordering, wherein the packet-processing node is programmed to decide whether to update the quality of service of the IP flow based at least in part on available network resources determined from a traffic flow through the packet-processing node in response to receiving an indication from the access network that an update of quality of service is desired and, if a decision is made to update the quality of service of the IP flow, to determine new quality of service parameters for the update and send an update message including the new quality of service parameters to the access network, wherein the access network is programmed to grant an update to the quality of service of the IP flow including a portion of the IP flow between the first access terminal and the access network in response to the update message from the packet-processing node and send an acknowledgment of the update message and a registration request message to the packet-processing node, wherein the packet-processing node is further programmed to send a reply to the registration request message to the access network, and wherein sending the registration request message from the access network to the packet-processing node includes sending updated quality of service information for the IP flow.

13. The wireless communication system of claim 12, wherein the update includes a change from any level of quality of service to any other level of quality of service, including no quality of service level.

14. The wireless communication system of claim 12, wherein the wireless communication system is part of a Code Division Multiple Access (CDMA) network.

15. The wireless communication system of claim 12, further comprising an external device for deciding to update the quality of service.

16. The wireless communication system of claim 12, wherein the IP flow is a group of IP flows.

17. A method for updating a quality of service of an existing IP flow for delivering a content on a CDMA network, wherein the IP flow is between a first access terminal and a second access terminal, through an access network in communication with a packet data serving node, comprising:

receiving, at the packet data serving node, an indication from the access network that an update of the quality of service of the IP flow is desired, wherein the IP flow is mapped to an A10 connection, wherein the quality of service relates to the measure of service quality to an application, the quality of service including one or more of best efforts, bandwidth guarantee, latency guarantee, and packet ordering;

in response to receiving the indication, deciding, at the packet data serving node, whether to update the quality of service of the IP flow based at least in part on available network resources determined from a traffic flow through the packet-processing node;

if a decision is made to update the quality of service of the IP flow, determining new quality of service parameters for the update and sending an A11-session update message including the new quality of service parameters from the packet data serving node to the access network;

sending an A11-session update acknowledge message of the update message, from the access network to the packet data serving node;

granting an update to the quality of service of the IP flow at the access network including a portion of the IP flow between the first access terminal and the access network;

in response to the update, sending an A11-registration request from the access network to the packet data serving node including updated quality of service information of the IP flow; and sending an A11-registration reply, to the registration request message, from the packet data serving node to the access network.

18. The method of claim 17, further comprising basing the update decision at least in part on network policy.

19. The method of claim 17, further comprising receiving a request to update the quality of service from at least one of the first access terminal and second access terminal, wherein the update decision is based at least in part on the request to update the quality of service.

20. The method of claim 17, further comprising receiving a request to update the quality of service from a remote device, wherein the update decision is based at least in part on the request to update the quality of service.

21. The method of claim 17, wherein the update is a change from any level of quality of service to any other level of quality of service, including no quality of service level.

22. The method of claim 17, wherein the IP flow is a group of IP flows.

23. The method of claim 1, wherein the update to the quality of service includes upgrading the quality of service and wherein deciding, at the packet-processing node, whether to update the quality of service includes determining whether the access network can support a level of quality of service corresponding to the requested upgrade.

24. The method of claim 17, wherein the update to the quality of service includes upgrading the quality of service and wherein deciding, at the packet data serving node, whether to update the quality of service includes determining whether the access network can support a level of quality of service corresponding to the requested upgrade.

* * * * *